United States Patent [19]

Barnwell et al.

[11] Patent Number: 4,522,360
[45] Date of Patent: Jun. 11, 1985

[54] PASSIVE DRAG CONTROL OF AIRFOILS AT TRANSONIC SPEEDS

[75] Inventors: Richard Barnwell, Newport News; Dennis Bushnell, Wicomico, both of Va.; Henry T. Nagamatsu, Schenectady; Lakhdar Bahi, Troy, both of N.Y.; Janet Ross, Burbank, Calif.

[73] Assignee: Rensselaer Polytechnic Institute, Troy, N.Y.

[21] Appl. No.: 489,056

[22] Filed: Apr. 27, 1983

[51] Int. Cl.³ .............................................. B64C 21/08
[52] U.S. Cl. .................................... 244/204; 244/208; 244/130
[58] Field of Search ............... 244/203, 204, 205, 208, 244/209, 130

[56] References Cited

U.S. PATENT DOCUMENTS

| | | | |
|---|---|---|---|
| 2,111,530 | 3/1938 | De Seversky | 244/209 |
| 2,508,288 | 5/1950 | Owner et al. | 244/209 |
| 2,956,760 | 10/1960 | Attinello | 244/130 |
| 4,146,202 | 3/1979 | Pender | 244/209 |

FOREIGN PATENT DOCUMENTS

| | | | |
|---|---|---|---|
| 501548 | 7/1930 | Fed. Rep. of Germany | 244/208 |
| 699066 | 11/1940 | Fed. Rep. of Germany | 244/208 |
| 2064709 | 6/1981 | United Kingdom | 244/209 |

OTHER PUBLICATIONS

NASA Facts, "Laminar Flow Control Technology" NF-86, Aug. 1979.

Primary Examiner—Galen L. Barefoot
Attorney, Agent, or Firm—McGlew and Tuttle

[57] ABSTRACT

An airfoil for transonic speeds includes a porous top surface extending from a location about 50 to 60% of the chord length from a leading edge of the airfoil to a location about 80 to 90% of the chord length from the leading edge. A cavity is defined under the porous surface in the airfoil which has a depth of from 0.05 to 0.2% of the chord length. The porosity of the porous surface is chosen to be from 1 to 3% of the total airfoil surface and may be variable. The presence of the porous surface and cavity decrease airfoil drag at transonic speeds by providing a pathway between a high pressure area downstream of a shock wave formed on the airfoil at transonic speeds to a low pressure area within a bubble on the airfoil upstream of the shock wave.

13 Claims, 6 Drawing Figures

PASSIVE DRAG CONTROL OF AIRFOILS AT TRANSONIC SPEEDS

This invention was made with Government support under Contract/Grant No. NSG1624 awarded by National Aeronautica and Space Administration. The Government has certain rights in this invention.

FIELD AND BACKGROUND OF THE INVENTION

The present invention relates in general to airfoil design and in particular to a new and useful arrangement for decreasing airfoil drag at transonic speeds using a porous surface area on the airfoil.

As the airstream passing an airfoil reaches the speed of sound, various phenomenon occur. The study of such phenomenon are important not only for supersonic aircraft but also for airfoils, such as helicopter rotor tips, which may operate at transonic speeds.

During transonic flight, a dramatic increase in wing drag takes place as the drag divergence Mach number is reached. A shock wave is formed on the airfoil at a point usually more than 50% of the chord length back from the leading edge of the airfoil. The shock wave forms a trailing boundary for a supersonic "bubble" which is totally embedded in a subsonic flow. The shock wave produces wave drag and soon after the appearance of the shock wave, the drag increases rapidly with increasing freestream Mach number leading to a "drag rise Mach number". One of the main objectives of designing a wing for transonic speeds is to obtain as high a "drag rise Mach number" as possible, subject to certain constraints. In principle, so called super critical airfoils are shaped to delay the drag rise associated with energy losses caused by shock waves and flow separation. Two articles which discuss this and are incorporated here by reference are "Low-Speed Aerodynamic Characteristics of a 14% Thick NASA Phase 2 Supercritical Airfoil Designed for Lift Coefficient of 0.7," NASA TM 81912, December 1980, by Harris et al and "Aerodynamic Characteristics of a 14% Thick NASA Supercritical Airfoil 33 Designed for a Normal Force Coefficient of 0.7," NASA TM X-72712, February 1981, by Harris.

It is also known to utilize porous surfaces on airfoils for transonic speed drag control as disclosed in U.S. Pat. No. 2,643,832 to Thwaites, U.S. Pat. No. 3,843,341 to Dannenberg et al and U.S. Pat. No. 3,128,973 to Dannenberg.

SUMMARY OF THE INVENTION

An object of the present invention is to provide an arrangement for controlling drag increase due to the shock wave/boundary layer interaction of conventional and supercritical airfoils at transonic speeds.

Accordingly, an object of the present invention is to provide an airfoil for transonic speeds which includes a porous top surface extending from a location starting at about 50 to 60% of the chord length of the airfoil from a leading edge thereof to a location at about 80 to 90% of the chord length from the leading edge, with means defining a cavity in the airfoil below the porous surface.

Another object of the invention is to provide such an airfoil wherein the depth of the cavity below the porous surface is from 0.05 to 0.2% of the chord length, the porosity of the porous surface being from about 1 to 3% of the total airfoil surface area.

A further object of the invention is to provide such an airfoil which includes means for varying the porosity of the porous surface from 0 to 3% of the total airfoil surface area.

A further object of the invention is to provide a method of reducing drag caused by pressure waves formed at transonic speeds on an airfoil which comprises establishing a porous surface on the airfoil starting as close as 50% of the chord length from a leading edge of the airfoil to up to 90% of the chord length from the leading edge, and providing a cavity between the porous surface for passing air from a high pressure area downstream of the shock wave to a low pressure area upstream of the shock wave on the airfoil.

Another object of the invention is to provide an airfoil with reduced drag resistance at transonic speeds which is simple in design, rugged in construction and economical to manufacture.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF THE PREFERRED EMBODIMENTS

Figure 1:
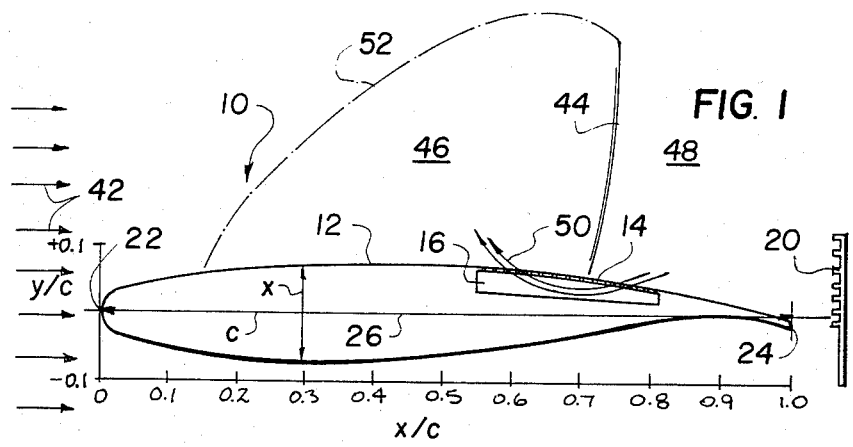
FIG. 1 is a schematic sectional view of an airfoil constructed in accordance with the invention with surrounding instrumentation and reference information utilized in testing the airfoil.

Referring to the drawings in particular, the invention embodied therein, in FIG. 1, comprises an airfoil generally designated 10 which can be utilized in a transonic aircraft or for helicopter rotors. The airfoil shown in FIG. 1 is of the supercritical type. The present invention is equally applicable to more conventional airfoils.

In accordance with the invention, the upper surface 12 of airfoil 10 is provided with a porous surface area 14. The porosity of area 14 can be established by providing a plurality of holes in the skin of the airfoil or by utilizing material having inherent porosity.

A passive or closed cavity 16 is defined beneath surface 14. A pressure probe 20 is utilized to measure downstream pressure conditions and includes eight vertically spaced and individual pressure openings positioned to receive the airstream flowing off the top of airflow 10. Airflow 10 extends at the chord length c from a leading edge 22 to a trailing edge 24. The horizontal scale below airfoil 10 indicates positions along the chord or reference line 26, in units of airfoil thickness x over chord length c. The term "passive cavity" is used to mean that cavity 16 only receives and discharges air through surface area 14 and not elsewhere.

In tests conducted to verify the usefulness of the present invention, a NASA critical airfoil having coordinates corresponding to the TABLE was utilized.

Figure 2:
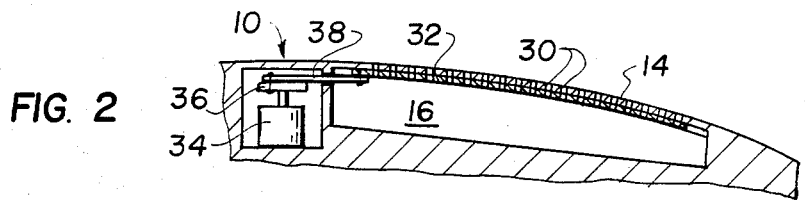
FIG. 2 is an enlarged partial sectional view of a portion of another embodiment of the airfoil showing means for varying the porosity of the porous surface for the airfoil.
Figure 3:
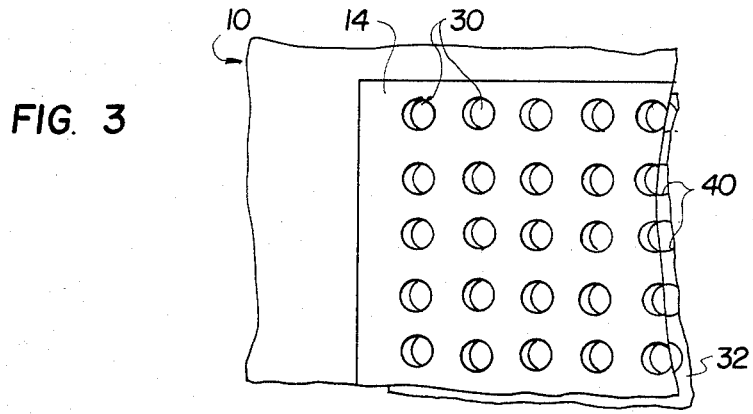
FIG. 3 is an enlarged top plan and partial view of the embodiment of FIG. 2 showing the manner in which the porosity can be changed.

As shown in FIG. 2, the porous surface 14 comprises a section of aluminum wing skin (which can be 0.10 inches in thickness) having a plurality of spaced perforations 30 therein as shown in FIG. 3. The total porosity of section 14 with respect to the surface area of airfoil 10, that is the ratio of the total area for all openings 30 to the area of airfoil 10, can be varied within the preferred range of 1 to 3% by moving a movable perforated plate 32 slidably mounted in cavity 16 below porous surface area 14. This movement can be achieved during flight by any suitable means. In the illustration shown in FIG. 2, a stepping motor 32 mounted in an adjacent cavity of airfoil 10 rotates a cam disc 36 which is connected to a linkage 38. Linkage 38 is in turn connected to movable perforated plate 32.

As shown in FIG. 3, the perforations 40 of movable plate 32 can be fully aligned or fully disaligned with openings 30 to vary the actual porosity of porous surface area 14. In FIG. 3 openings 30 are shown partially closed by openings 40.

Referring once more to FIG. 1, when supercritical airfoil 10 is positioned in a transonic airstream indicated by arrows 42, a shock wave 44 is established and extends upwardly from the top surface 12 of airfoil 10. A supersonic "bubble" is formed in the area labelled 46 which is at lower ambient pressure than the surrounding air, and in particular the air mass at area 48 which is downstream of the shockwave 44. For this reason, air from this downstream high pressure area 48 will pass in the direction of arrows 50 through the porous surface 14 and cavity 16 into the low pressure area 46. This situation occurs at Mach numbers greater than approximately 0.75. A sonic dot dash line 52 bounds the sonic "bubble" 46.

While, as will be set forth in greater detail hereinunder, at transonic speeds drag is advantageously reduced due to the establishment of secondary shock waves which dissipate the energy of shock wave 44, at subsonic speeds drag is adversely affected by porous area 14. For this reason, the porosity of area 14 is carefully selected or, as possible in the embodiment of FIG. 2, the porosity is varied to reduce porosity for subsonic speeds and increased porosity for transonic speeds.

Porous area 14 is advantageously positioned to begin at a location from 50 to 60% of the chord length behind the leading edge 22, to a point from 80 to 90% of the chord length behind leading edge 22. The depth of cavity 16 is preferably from 0.05 to 0.2% the chord length.

During actual wind tunnel experiments, a 12% thick bi-convex and a 14% thick supercritical airfoil was utilized in a 3 in.×15.4 in. transonic wind tunnel. The airfoils were tested at Mach numbers of from 0.65 to 0.82.

A supercritical airfoil shaped in accordance with the NASA supercritical airfoil defined by Table 1 was utilized but had a 4-inch chord. The porous area 14 extended from 58% to 83% of the chord length. 487 holes 30 were drilled into the skin of airfoil 10 each having a 0.028 inch diameter. The airfoil skin was 0.1 inches thick. While the porosity of area 14 was chosen to be 10% for the area, this corresponded to a 2.4% porosity over the total airfoil surface. Experiments were conducted also using a 1.25% porosity by blocking half of the holes 30.

Figure 4:
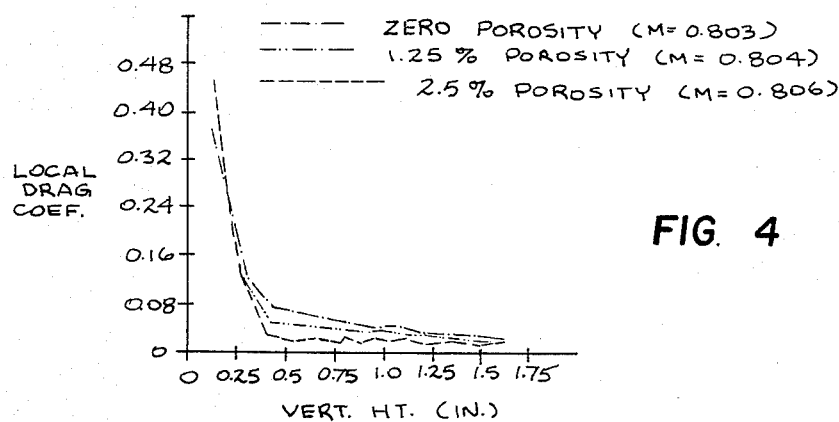
FIG. 4 is a graph showing vertical height from the airfoil plotted against local draft coefficient for the airfoil at transonic speeds and for three porosity values.

FIG. 4 illustrates the effect of changing porosity for area 14. The dot dash line indicates the relatively high local drag coefficient values whereas no porosity was provided in the airfoil, that is area 14 was totally blocked or replaced by a solid airfoil skin. Reduced drag was achieved at a 1.25% porosity value as shown by the double dot dash line. Even more reduced values were achieved by the 2.5% porosity value. The 0 porosity experiment was conducted at a Mach number 0.803, the 1.25% porosity experiment was conducted at a Mach number 0.804 and the 2.5% porosity experiment was conducted at a Mach number of 0.806. The reduced drag was achieved thus even with slightly increased Mach numbers.

Figure 5:
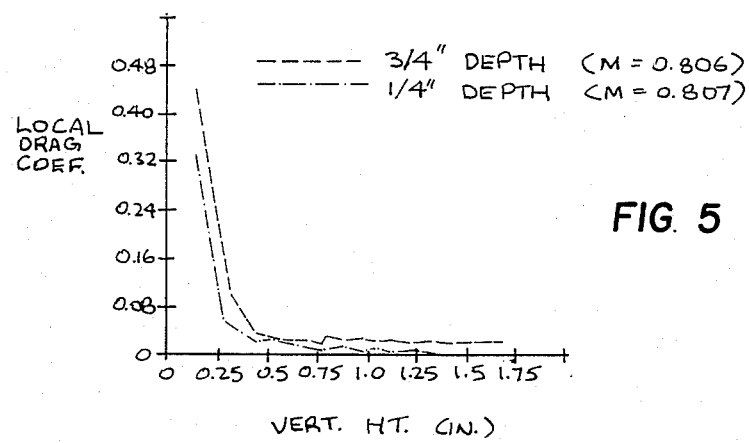
FIG. 5 is a graph similar to FIG. 4 showing the effect of cavity depth on local drag coefficient.

To determine the importance of the depth for cavity 16, experiments were conducted with the cavity at a depth of ¼ inch and ¾ of an inch respectively. Porosity was set at 2.5% and Mach numbers of around 0.81 were utilized. FIG. 5 demonstrates that the reduced depth of ¼ inch produced less drag than the ¾ inch depth for cavity 16. This is attributed to the fact that the ¼ inch depth cavity was expected, and did produce larger pressure differences between the flow upstream of the terminating shock wave and the flow within the cavity, than did the ¾ inch deep cavity.

TABLE

SECTION COORDINATES FOR SUPERCRITICAL AIRFOIL
[c = 61.0 cm (24 in.); leading-edge radius = 0.030c]

| x/c | $(z/c)_u$ | $(z/c)_l$ | x/c | $(z/c)_u$ | $(z/c)_l$ |
|---|---|---|---|---|---|
| 0.0000 | 0.0000 | 0.0000 | 0.240 | 0.0659 | −0.0661 |
| .002 | .0108 | −.0108 | .250 | .0665 | −.0667 |
| .005 | .0167 | −.0165 | .260 | .0670 | −.0672 |
| .010 | .0225 | −.0223 | .270 | .0675 | −.0677 |
| .020 | .0297 | −.0295 | .280 | .0679 | −.0681 |
| .030 | .0346 | −.0343 | .290 | .0683 | −.0685 |
| .040 | .0383 | −.0381 | .300 | .0686 | −.0688 |
| .050 | .0414 | −.0411 | .310 | .0689 | −.0691 |
| .060 | .0440 | −.0438 | .320 | .0692 | −.0693 |
| .070 | .0463 | −.0461 | .330 | .0694 | −.0695 |
| .080 | .0484 | −.0481 | .340 | .0696 | −.0696 |
| .090 | .0502 | −.0500 | .350 | .0698 | −.0697 |
| .100 | .0519 | −.0517 | .360 | .0699 | −.0697 |
| .110 | .0535 | −.0533 | .370 | .0700 | −.0697 |
| .120 | .0549 | −.0547 | .380 | .0700 | −.0696 |
| .130 | .0562 | −.0561 | .390 | .0700 | −.0695 |
| .140 | .0574 | −.0574 | .400 | .0700 | −.0693 |
| .150 | .0585 | −.0585 | .410 | .0699 | −.0691 |
| .160 | .0596 | −.0596 | .420 | .0698 | −.0689 |
| .170 | .0606 | −.0606 | .430 | .0697 | −.0686 |
| .180 | .0615 | −.0616 | .440 | .0696 | −.0682 |
| .190 | .0624 | −.0625 | .450 | .0694 | −.0678 |
| .200 | .0632 | −.0633 | .460 | .0692 | −.0673 |
| .210 | .0640 | −.0641 | .470 | .0689 | −.0667 |
| .220 | .0647 | −.0648 | .480 | .0686 | −.0661 |
| .230 | .0653 | −.0655 | .490 | .0683 | −.0654 |
| 0.500 | 0.0680 | −0.0646 | 0.760 | 0.0457 | −0.0173 |
| .510 | .0676 | −.0637 | .770 | .0442 | −.0152 |
| .520 | .0672 | −.0627 | .780 | .0426 | −.0132 |
| .530 | .0668 | −.0616 | .790 | .0409 | −.0113 |
| .540 | .0663 | −.0604 | .800 | .0392 | −.0095 |
| .550 | .0658 | −.0591 | .810 | .0374 | −.0079 |
| .560 | .0652 | −.0577 | .820 | .0356 | −.0064 |
| .570 | .0646 | −.0562 | .830 | .0337 | −.0050 |
| .580 | .0640 | −.0546 | .840 | .0317 | −.0038 |
| .590 | .0634 | −.0529 | .850 | .0297 | −.0028 |
| .600 | .0627 | −.0511 | .860 | .0276 | −.0020 |
| .610 | .0620 | −.0493 | .870 | .0255 | −.0014 |
| .620 | .0613 | −.0474 | .880 | .0233 | −.0010 |

TABLE-continued
SECTION
COORDINATES FOR SUPERCRITICAL AIRFOIL
[c = 61.0 cm (24 in.); leading-edge radius = 0.030c]

| x/c | $(z/c)_u$ | $(z/c)_l$ | x/c | $(z/c)_u$ | $(z/c)_l$ |
|---|---|---|---|---|---|
| .630 | .0605 | −.0454 | .890 | .0210 | −.0008 |
| .640 | .0596 | −.0434 | .900 | .0186 | −.0008 |
| .650 | .0587 | −.0413 | .910 | .0162 | −.0011 |
| .660 | .0578 | −.0392 | .920 | .0137 | −.0016 |
| .670 | .0568 | −.0371 | .930 | .0111 | −.0024 |
| .680 | .0558 | −.0349 | .940 | .0084 | −.0035 |
| .690 | .0547 | −.0327 | .950 | .0057 | −.0049 |
| .700 | .0536 | −.0305 | .960 | .0029 | −.0066 |
| .710 | .0524 | −.0283 | .970 | .0000 | −.0086 |
| .720 | .0512 | −.0261 | .980 | −.0030 | −.0109 |
| .730 | .0499 | −.0239 | .990 | −.0062 | −.0136 |
| .740 | .0486 | −.0217 | 1.000 | −.0095 | −.0165 |
| .750 | .0472 | −.0195 | | | |

Figure 6:
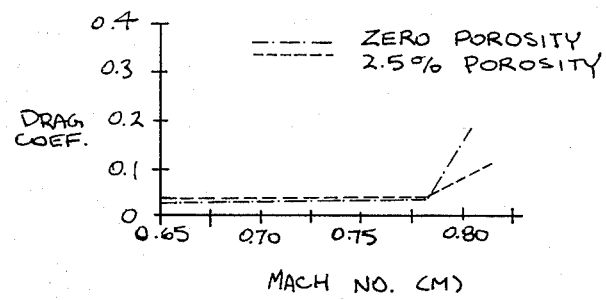
FIG. 6 is a graph plotting Mach number against drag coefficient for an airfoil having a porous area and one having no porous area.

To demonstrate the usefulness of providing porous area 14 at all, experiments were conducted utilizing varying Mach numbers from 0.65 to 0.82. As shown in FIG. 6, at Mach numbers below 0.77, the airfoil with 2.5% porosity at slightly higher drag values than the airfoil with no porosity. Above 0.77 however, the airfoil with no porosity experiences a drastic increase in drag coefficient which is far less pronounced for the airfoil having porosity.

To investigate the mechanisms at work, Schlieren photographs were taken of the flow over the 14% thick supercritical airfoil, with and without the porous surfaces at a Mach number of about 0.81. For the airfoil having a solid non-porous surface, these photographs revealed a strong normal shock wave at transonic speeds. Photographs taken of the experiment when a porous surface was provided revealed the existence of an oblique shock wave oriented at the leading edge of the porous surface and terminating at the normal shock wave. The entropy increase through the oblique shock wave system is less than that through the single shock wave for the solid surface. A wake impact pressure survey downstream of the airfoil showed lower drag with the porous surface.

While specific embodiments of the invention have been shown and described in detail to illustrate the application of the principles of the invention, it will be understood that the invention may be embodied otherwise without departing from such principles.

What is claimed is:

1. An airfoil for transonic speeds having a leading edge and comprising a porous top surface area extending from a location at about 50 to 60% of a chord length from the leading edge, to a location at about 80 to 90% of the chord length from the leading edge, and passive means defining a cavity under said porous top surface area and in the airfoil having a depth of from 0.05 to 0.2% the chord length.

2. An airfoil according to claim 1, wherein said passive means defines a closed cavity under said porous top surface area.

3. An airfoil according to claim 1, wherein said porous surface area extends from 58% to 83% of the chord length from the leading edge.

4. An airfoil according to claim 1, wherein the porosity of said porous surface area is from 1 to 3% of the total airfoil surface area.

5. An airfoil according to claim 3, wherein said porosity is from 1.25% to 2.5% of the total airfoil surface area.

6. An airfoil according to claim 1, including means for varying the porosity of the porous surface area from 0 to 3% of the total airfoil surface area.

7. An airfoil according to claim 6, wherein said porous surface area is defined by a fixed perforated plate on said airfoil, said means comprising a movable perforated plate movable under said fixed perforated plate in said cavity and drive means for driving said movable perforated plate.

8. An airfoil according to claim 7, wherein fixed and movable perforated plates have corresponding openings which are alignable to maximize the amount of porosity of said porous surface area and disalignable to reduce the porosity of said porous surface area.

9. A passive method of reducing drag of an airfoil at transonic speeds comprising providing a porous surface area on the airfoil extending as close as 50% of a chord length from a leading edge of the airfoil to as far as 90% of the chord length from the leading edge of the airfoil, and defining a cavity below the porous surface area for passing air from a high pressure area downstream of a pressure wave established on the airfoil during transonic speeds, to a low pressure area upstream of the shock wave and not elsewhere.

10. A method according to claim 9, including varying the porosity of the porous surface area from 0 to 3% of the total airfoil surface area, the porosity being maintained at from 1 to 3% during transonic speeds.

11. A method according to claim 9, including providing a cavity with a depth of from 0.05 to 0.2% of the chord length.

12. A method according to claim 11, wherein the porosity of the porous surface area is chosen to be from 1 to 3% of the total airfoil surface area.

13. A method according to claim 9, wherein the porous surface area on the airfoil extends from a location at about 50 to 60% of the chord length from the leading edge to a location at about 80 to 90% of the chord length from the leading edge.

* * * * *